(Model.) 3 Sheets—Sheet 1.
S. D. WARFIELD.
MACHINE FOR CUTTING GREEN CORN FROM THE COB.
No. 281,588. Patented July 17, 1883.
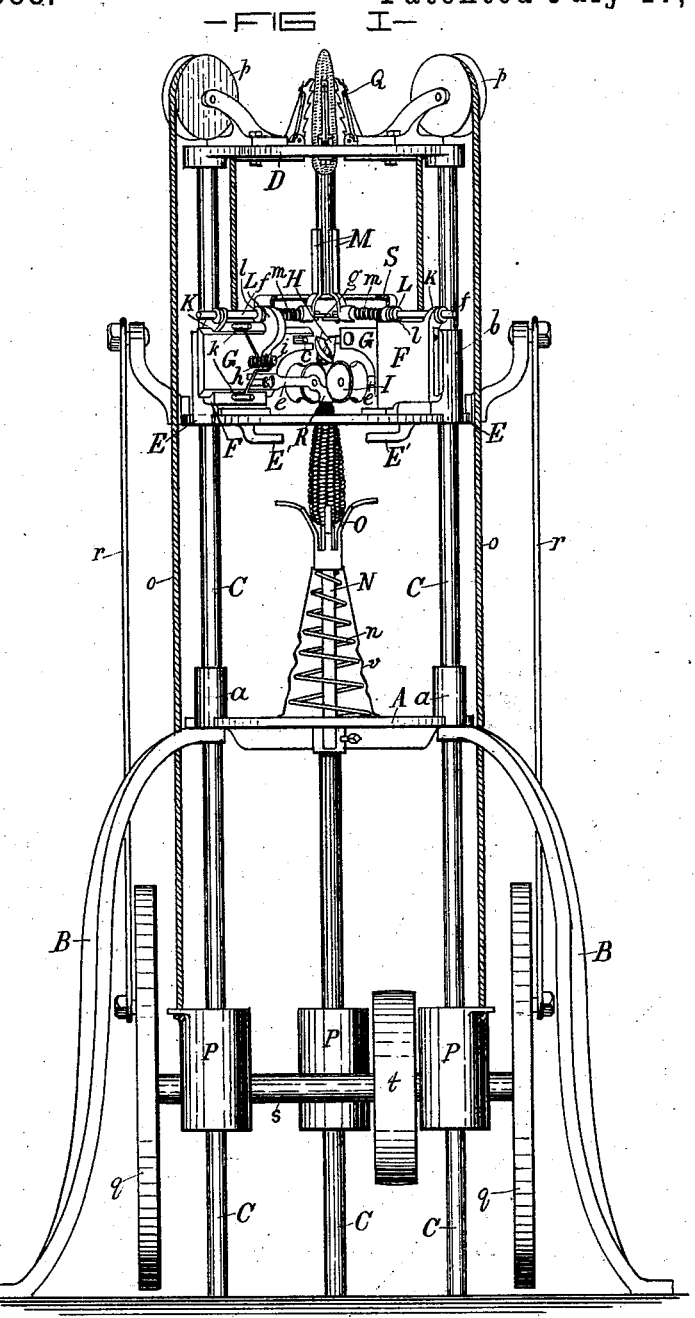

(Model.) 3 Sheets—Sheet 2.
S. D. WARFIELD.
MACHINE FOR CUTTING GREEN CORN FROM THE COB.
No. 281,588. Patented July 17, 1883.
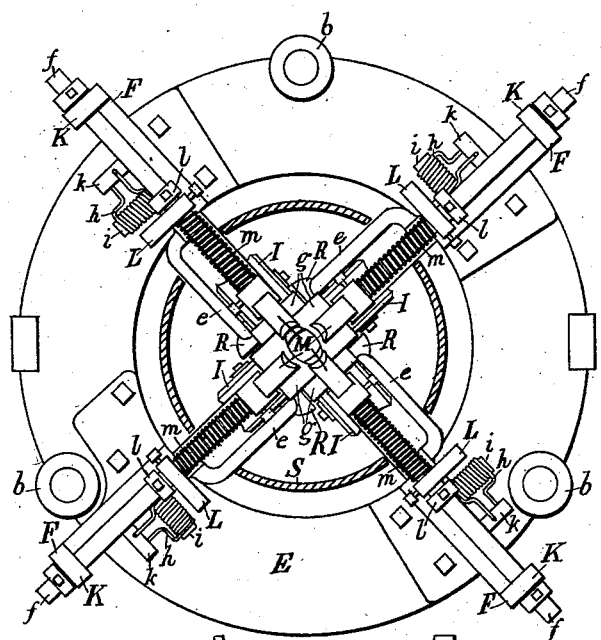
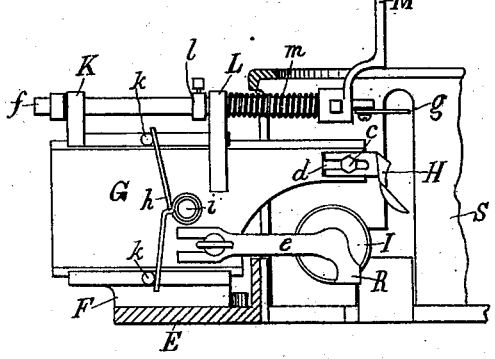
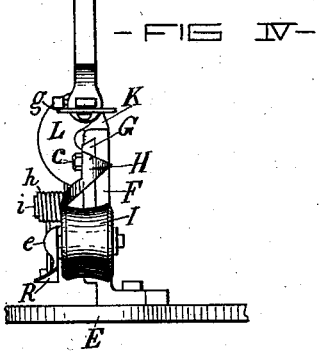
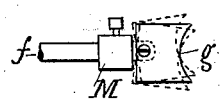
WITNESSES
Danl Fisher
Ed. J. Diggs
INVENTOR
Solomon Davies Warfield,
by Geo. W. Howard,
Attys.

(Model.)
S. D. WARFIELD.
MACHINE FOR CUTTING GREEN CORN FROM THE COB.
No. 281,588. Patented July 17, 1883.
3 Sheets—Sheet 3.
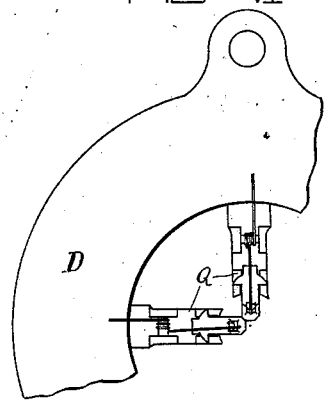
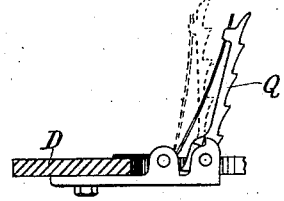
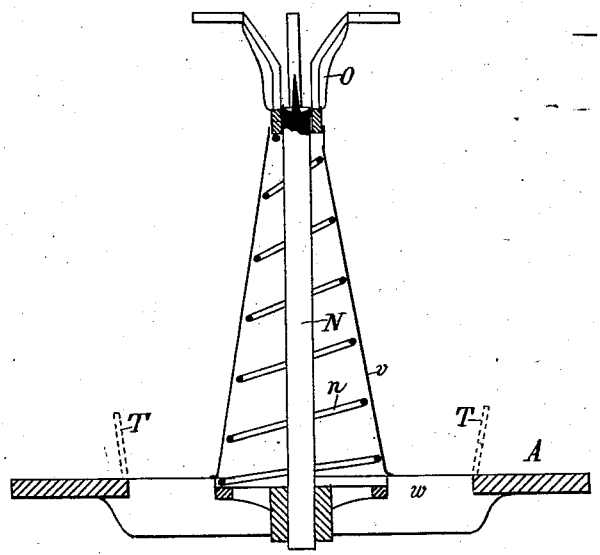
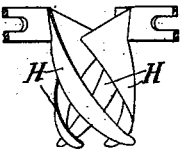
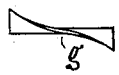
WITNESSES
Danl. Fisher
Edw. J. Diggs
INVENTOR
Coleman Davies Warfield
by G. W. H. Howard
Atty.

UNITED STATES PATENT OFFICE.

SOLOMON D. WARFIELD, OF BALTIMORE, MARYLAND.

MACHINE FOR CUTTING GREEN CORN FROM THE COB.

SPECIFICATION forming part of Letters Patent No. 281,588, dated July 17, 1883.

Application filed January 22, 1883. (Model.)

*To all whom it may concern:*

Be it known that I, SOLOMON DAVIES WARFIELD, of the city of Baltimore and State of Maryland, have invented certain Improvements in Green-Corn Cutters, of which the following is a specification.

This invention relates to certain improvements in various parts of the machine, as will hereinafter fully appear.

In the description of the invention which follows, Figure I is a side elevation of the improved machine. Figs. II to IX, inclusive, are details of the invention on an enlarged scale. Fig. X illustrates a modification in a part of the machine.

Similar letters of reference indicate similar parts in all the views.

A is a table supported by suitable legs, B.

C C are rods which pass through and are secured in lugs $a$ on the table A and sustain the head-plate D. The rods C, for reasons hereinafter set forth, are extended to the floor, and they, together with the legs B, may be coupled together by a frame or floor plate, (not shown,) if desired.

E is a reciprocating head, to which the cutting-knives and a number of other devices which regulate the cutting and other operations, hereinafter described, are united. In order that the head E may slide freely on the rods C, the boxes $b$, which form a part of the said head, and through which the rods C pass, have a length considerably in excess of their diameter, and they are either accurately bored to suit the rods C, or cast with holes much larger than the rods, and the annular space thus formed filled with Babbitt metal, which latter method cheapens the manufacture.

F F are brackets fastened to the upper face of the head E, (see particularly Figs. II, III, and IV,) in which the knife-plates G are adapted to slide. In the drawings the said knife-plates are shown as dovetailed into the brackets F; but I do not limit myself to this arrangement, as they can be held in various other ways to admit of their having the sliding movement described.

H H are knives which consist of pieces of sheet-steel bent in the form shown in Figs. I, III, IV, and IX, and slotted to admit of their attachment to the knife-plates G by means of a screw, $c$. The knives are constructed to interlock, so that they can be drawn together to suit the smallest ear usually met with. The said knives rest in depressions $d$, which correspond with them in width. Consequently they must invariably occupy the same position, and no care need be exercised in resetting them after they have been removed for sharpening, except in a longitudinal direction.

I I are rollers on adjustable arms $e$, secured to the knife-plates G in a manner similar to the knives H.

K and L are lugs through which rods $f$, carrying the scrapers $g$, pass, and they project, respectively, from the brackets F and the knife-plates G. The scrapers $g$ consist of flat pieces of steel curved or hollowed at their inner edge, and while they are carried or supported by the rods $f$ they are not connected directly to them, but to the hub of the lower cob-holders, M, hereinafter more particularly alluded to. Springs $h$, coiled around a spur, $i$, on the knife-plates G, with their ends resting against pins $k$ on the brackets F, serve to force the said knife-plates, with their knives, rollers, scrapers, and other attachments, toward the center of the machine, and keep a steady pressure on the ear during the cutting operation. In Fig. X a scraper is shown with an oblique scraping-edge. The scraper-rods $f$ have an adjustable collar, $l$, secured thereto exteriorly of the lug L. Consequently in the backward movement of the knife-plates the scrapers are carried in the same direction; but as it is necessary that the scrapers should exercise a certain pressure on the ear independently of that produced by the spring $h$, I place between the cob-holders M and the lug L a spiral spring, $m$. This can be placed between the collar $l$ and the lug K, and a similar effect produced, if desired.

N is a pointed center bar, upon which the ear to be cut is placed, and it projects from the center of the table A. (See Fig. VIII.)

O is the centering device, which consists of a hub with flaring prongs extending from its upper surface, adapted to slide on the center rod, N. This centering device is shown as held yieldingly by a volute spring, $n$; but a weighted lever or other device may be used for the purpose without materially affecting the operation of the machine.

The sliding head E is counterbalanced by weights P, to which it is connected by means of ropes or chains o, which pass over sheaves p on the head-plate D. To prevent the weights having a swinging or vibratory movement, I adapt them to slide on the rods C, which extend below the table to admit of this connection.

The machine can be operated by the foot through the medium of a treadle, or by hand-power; but it is designed, where practicable, to effect the vertical reciprocating movement of the plate E and its attachments by means of cranks or crank-wheels q, connected to the said plate by rods r, the said crank-wheels being fastened to a driving-shaft, s, having a driving-pulley, t, thereon, as shown in Fig. I of the drawings. The hangers or bearings for the driving-shaft are not shown, as they embody no part of my invention, and their illustration would only tend to a complication of lines and obscure other parts of the machine. Parts of the invention not yet alluded to will be described and their uses set forth in the description of the operation of the machine which follows.

Supposing the machine to be in operation, and the head E at its highest point, an ear of corn is placed in the pronged centering device O and pressed down. When the centering-prongs yield, the ear is guided to the center point of the rod N, on which it remains in a practically vertical position. As the head E descends, the point of the ear passes between the gaging-rollers I, and they are forced out, carrying with them the knife-plates G, scrapers g, and knives H. As the head E approaches the centering-prongs O, projections E' on the lower face of the head strike the ends of the prongs and force them down and out of the way of the rollers I, compressing the springs n in the operation. It will be understood that the cutting-edge of the knives H projects sufficiently far within the curved surface of the rollers to give the proper depth of cut; or, in other words, the rollers are adjusted so that the knives cut the grain to any depth required, leaving the cob untouched. In the movement of the knife-plates, as described, the scrapers g and the cob-holders M are also forced back, compressing the springs m, and as the scrapers are set to project beyond the knives, they, upon coming in contact with the cob, detach from the same the portion of grain which is below the surface of the cob. By having the spring m located between the hub of the cob-holder M and the lug L, which moves out with the whole cutting and scraping mechanism, a much shorter spring m is used than if the said lug were fixed. The object of this spring, it must be understood, is to make the scrapers exert a yielding pressure on the cob independently of that exerted by the spring h. Further, it will be seen that the rollers, by communicating movement to the scraper-rods through the medium of the lugs L and collar l, gage, also, the projection of the scrapers, while they are free to move still farther back, in view of the compressibility of the springs m. It follows, therefore, that in cutting ears devoid of a point, the end of the cob cannot strike against the lower side of the scrapers, but is forced between the edges of the series of scrapers and the scraping action effected by the pressure of the spring m only.

The scrapers are pivoted to the hub of the cob-holder M, in order that they may alter their position to suit any longitudinal curvature or any other irregularity in the shape of the cob. In Fig. V a scraper is shown, as indicated, in a central position by full lines, and its extremes in either direction by a dotted delineation. The downward movement of the head E and its attachments with reference to the position of the ear when centered is such that the scrapers pass entirely below the butt of the cob, where they assume their original positions. The cob is then in the holders, with the scrapers directly beneath it, and as the head E rises the cob is drawn from the center point by the scrapers and carried to between the spring upper holders, Q, which are toothed to prevent the withdrawal of the cob as the lower holders, M, descend in the next downward stroke of the cutting mechanism.

While I prefer to have the cob removed from the center by means of the scrapers, I do not wish to be restricted to this arrangement, as independent devices may be employed to lift the cob from the center. The construction of the upper cob-holders, Q, will be seen by referring to Figs. I and VII, and in the latter figure the extremes of movement of the holders are indicated by dotted and full lines.

From the foregoing description it will be understood that at each upward stroke of the head E and its attachments a cob is carried by the lower to the upper holders, and, in entering the latter, forces out the one previously deposited. I propose to place over the head-plate D a deflecting-board or a chute to receive and carry away the cobs as they leave the holders Q.

R R are triangular deflecting-pieces, (see particularly Figs. II, III, and IV,) extending from the roller-arms e, to guide the point of the ear, if the said ear is not quite vertical, to between the rollers. These devices are only operative when the point of the ear has a tendency to pass exteriorly of instead of between the rollers. The grain, when cut from the cob, is thrown off radially from the knives, and to prevent the scattering of the grain and to guide it to the central opening in the plate E, I employ a hood, S, supported in any suitable manner, and slotted where necessary for the movement of the cutting and scraping devices. As the grain falls through the central opening of the head E, it is prevented from coming in contact with the center rod, N, upon which the prongs O slide, and the supporting-spring n, by a flexible covering, v, of canvas or other suitable material, which covering also guides the grain to the opening w in the table A. The canvas covering, by being attached to the hub of the centering-prongs and the table, answers the purpose of a stop for the said prongs in their upward movement. I propose to surround the opening w with a flange, T, (shown in dotted lines in Fig. VIII,) of some suitable material, to prevent the dispersion of the grain. The grain is finally caught in a bucket suspended under the table A or placed on the floor near the table, in which latter case a chute would be employed to conduct it to that receptacle.

While it is advisable to make the center rod, N, as small as possible, to allow the scrapers to come nearly in contact underneath the cob to raise it in their upward movement, I find that a small rod has a tendency to split the cob as it is forced down in the cutting operation. I therefore hollow the end of the said rod at the root of the point, as shown in Fig. VIII, thereby producing an annular projecting edge, which has, practically, the effect of a ferrule to hold the central pithy part of the cob closely together. This cupping of the end of the rod effectually obviates the above-named difficulty.

I have described and shown my improved corn-cutter as a vertical machine—that is to say, the cutting and scraping devices have a vertical reciprocating movement; but I do not limit myself to this design, as the machine may be placed horizontally.

I claim as my invention—

1. In a green-corn cutter, a reciprocating cutter-head consisting of a plate with a central opening for the passage of the ear, a series of interlocking knives with holders and suitable supports susceptible of a radial movement in a constant plane, springs to effect the radial sliding movement of the knives and holders toward the center of the said plate, and to give a yielding pressure to the said knives against the ear during the cutting operation, and gaging devices against which the ear impinges to effect the outward movement of the knives and their attachments, combined with a fixed center rod and yielding centering devices, substantially as specified.

2. In a green-corn cutter, a knife-support and knife adapted to have a radial movement in a constant plane, and a scraper fastened to the said knife-holder or some attachment thereof, adapted to have a similar movement, and to exert a yielding pressure on the cob independently of that produced by the spring which effects the movement of the said knife and its connections, the whole having a reciprocating movement, combined with a fixed center rod and yielding centering devices, substantially as specified.

3. In a green-corn cutter, the combination of a cutting-head adapted to have a reciprocating movement longitudinally of the ear of corn, provided with clamping devices to hold the cob after the cutting operation, and secondary clamping devices in which the cob is forced and held until displaced by another cob, substantially as specified.

4. In a green-corn cutter, the combination of a center rod, prongs adapted to slide on the said rod, devices to yieldingly sustain the end of the prongs beyond the center point, and a flexible covering for the said center rod, to prevent the contact of the removed grain therewith, substantially as specified.

5. In the cutting-head of a green-corn cutter, hollow-faced gaging-rollers, which serve to initiate the radial movement of the cutting-knives which are connected therewith, provided with deflecting-pieces to guide the entering ear to the practically circular space between the said rollers, substantially as specified.

6. As means for gaging the depth of cut of the knife of a green-corn cutter, a hollow-faced roller connected to the said knife, or to some attachment thereof, substantially as specified.

7. In a green-corn cutter, a fixed central supporting-rod for the ear, combined with a reciprocating head having a retractive device to remove the cob from its support, substantially as specified.

8. In a green-corn cutter, a non-rotative and reciprocating cutting-head with knives to surround the ear, combined with mechanism to effect the reciprocating motion of the said head longitudinally of the ear in the cutting operation, substantially as specified.

9. In a green-corn cutter, a vertically-reciprocating head carrying cutting and scraping devices adapted to slide on bars, a head-plate to connect the said bars at their upper end, sheaves supported by the said head-plate, ropes or chains extending from the cutting-head over the said sheaves, and provided at their other end with counterbalancing-weights, and means for effecting the reciprocating movement of the said cutting-head and its attachments, substantially as specified.

10. In a green-corn cutter, a vertically-reciprocating head carrying cutting and scraping devices adapted to slide on bars, a head-plate to connect the said bars at their upper end, sheaves supported by the said head-plate, ropes or chains extending from the cutting-head over the said sheaves, and provided at their other end with counterbalancing-weights which slide on the said bars, and means for effecting the reciprocating movement of the said cutting-head and its attachments, substantially as specified.

SOLOMON DAVIES WARFIELD.

Witnesses:
EDWARD J. DIGGS,
WM. T. HOWARD.